No. 831,412.   PATENTED SEPT. 18, 1906.
J. BROWN.
TROLLEY WHEEL.
APPLICATION FILED DEC. 16, 1905.
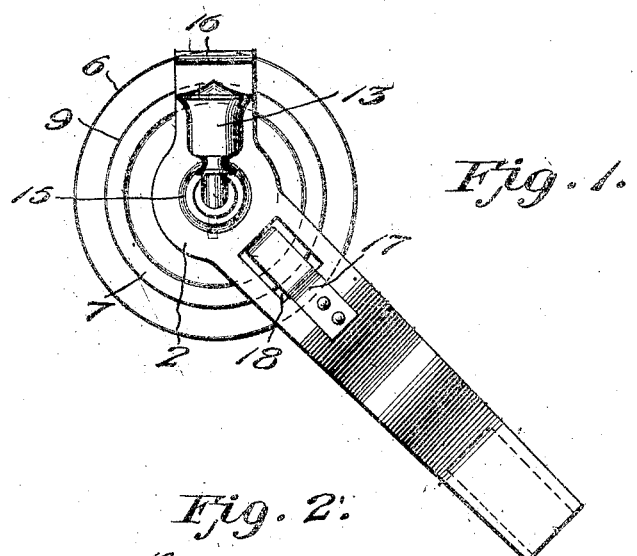
Fig. 1.
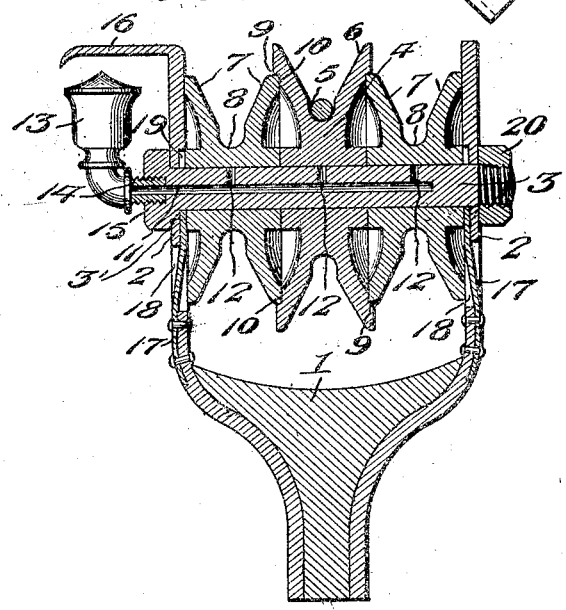
Fig. 2.
Fig. 3.
Witnesses
Frank B. Hoffman
H. H. Byrne
Inventor
John Brown
By Victor J. Evans
Attorney

UNITED STATES PATENT OFFICE.

JOHN BROWN, OF CAMDEN, NEW JERSEY.

TROLLEY-WHEEL.

No. 831,412.

Specification of Letters Patent.

Patented Sept. 18, 1906.

Application filed December 16, 1905. Serial No. 292,069.

*To all whom it may concern:*

Be it known that I, JOHN BROWN, a citizen of the United States, residing at Camden, in the county of Camden and State of New Jersey, have invented new and useful Improvements in Trolley-Wheels, of which the following is a specification.

This invention relates to an improved trolley-wheel designed primarily for use with the ordinary overhead conductor.

The main object of the present invention is the provision of means whereby accidental disconnection of the wheel from the trolley is prevented, the construction further providing for efficiently lubricating the wheel in use.

The invention will be described in the following specification, reference being had particularly to the accompanying drawings, in which—

Figure 1 is a view in side elevation of a trolley-wheel constructed in accordance with my invention. Fig. 2 is a vertical central section of the same. Fig. 3 is an elevation of the contact-strip.

Referring to the drawings, 1 represents a trolley-pole, and 2 the harp thereof, both of which parts aside from the details hereinafter noted may be of any desired type. My improved trolley-wheel is supported in the usual manner between the arms of the harp, being mounted upon an axle 3, preferably in the form of a headed bolt held against revolution by an integral key 3', fitting a recess in the harp-opening. Centrally mounted for revolution upon the axle is the main trolley-wheel 4, having the usual wire-receiving circumferentially-arranged groove 5, the side edges 6 of the peripheral depression formed in the wheel flaring from the groove to the free edges. In cross-section the groove 5 is a true semicircular depression with vertical side walls which extend above the base a sufficient distance to project above the plane of the trolley-wire when the latter is seated in the groove.

Auxiliary trolley-wheels 7 are mounted on opposite sides of the main wheel 4, being constructed identical with that of the main wheel except that they are of materially less diameter, so that the grooves 8 in the auxiliary wheels are located closer to the axle 3 than in the main wheel. The free edges of the groove-flanges of the auxiliary wheels next the main wheel are formed to provide a right-angled projection 9, and the contiguous surface of the main wheel is undercut to provide a groove 10 to receive the portions 9 of the auxiliary wheel, whereby obstruction is avoided and the wire leaving the main wheel will find its way with certainty to the wire groove in one of the auxiliary wheels.

Each of the main or auxiliary wheels are wholly independent so far as revolution is concerned and are lubricated through a channel 11, extending longitudinally of the axle 3 and communicating with the bearing-surface of each of said wheels through a by-pass 12. The channel 11 is supplied with suitable lubricant from an oil-cup or other receptacle 13, having a threaded nipple 14 designed to engage a threaded opening 15 in the end of the axle, the bore of the nipple being in open communication with the channel 11 and the interior of the receptacle.

The end of the harp-arm adjacent the oil-cup 13 is provided with a laterally-projecting section 16, designed to overlie the receptacle 13 and prevent the same from accidental contact with the trolley-wire.

Contact-strips 17, of brass or other material of high conductivity, are secured on the outer side of the respective harp-arms and pass through openings 18, formed in said arms and upward between the inner side of the harp-arms and the proximate end of the auxiliary trolley-wheel, the upper or free ends of said strips being enlarged and bifurcated at 19 to embrace the axle 3. The inner surfaces of the harp-arms are preferably recessed at 20 to receive the end of the contact-strips.

Owing to the spring effect gained by bending said strips through openings 18 in the harp-arms the free end of said strips are maintained under more or less spring tension with the effect to secure an electrical contact at this point.

As the wire-grooves 8 in the auxiliary trolley-wheels are on a lower plane than the wire-groove of the main trolley-wheel, it is evident that the usual projection of the harp-arms to prevent escape of the trolley-wire may be dispensed with, as when within the wire-groove of either auxiliary wheel the wire is farther removed from the free end of the harp-arms than would be the case without said auxiliary wire-grooves on a plane with the main grooves.

Having thus described the invention, what is claimed as new is—

1. A trolley-wheel comprising a main wheel, auxiliary wheels revolubly and independently mounted on each side of the main wheel, the edges of said auxiliary wheels seating in grooves formed in the approximate faces of the main wheel, the diameters of the auxiliary wheels being less than that of the main wheel, whereby the peripheral edge of the main wheel extends beyond and overlies the peripheral edge of the auxiliary wheel.

2. The combination with a trolley-pole and a harp therefor, of an axle fixed transversely of the harp-arms, a plurality of independently-mounted wire-receiving wheels arranged on the axle, said axle being formed with a longitudinal bore and with a by-pass communicating with the axle-bearing surface of each wheel and with said bore, a lubricant-receptacle supported by the axle beyond one of the harp-arms, said receptacle being in open communication with the axle-bore, the harp-arm adjacent the receptacle being bent laterally to overlie the receptacle and provide a guard therefor.

In testimony whereof I affix my signature in presence of two witnesses.

JOHN BROWN.

Witnesses:
JOSEPH C. BROWN,
HARRIET J. BROWN